United States Patent
Kim et al.

(10) Patent No.: US 9,820,517 B2
(45) Date of Patent: Nov. 21, 2017

(54) CARBOXYLIC ACID-MODIFIED NITRILE-BASED COPOLYMER LATEX COMPOSITION, PREPARATION METHOD THEREOF, AND LATEX COMPOSITION FOR DIP MOLDING INCLUDING THE SAME

(71) Applicant: LG CHEM, LTD., Seoul (KR)

(72) Inventors: Jung Eun Kim, Daejeon (KR); Seung Uk Yeu, Daejeon (KR); Jung Su Han, Daejeon (KR); Seung Hun Yang, Daejeon (KR); Byoung Yun Kim, Daejeon (KR); Hyun Woo Kim, Daejeon (KR); Yu Jin Cha, Daejeon (KR); Ji Hyun Kim, Daejeon (KR)

(73) Assignee: LG CHEM. LTD., Seoul (KR)

( * ) Notice: Subject to any disclaimer, the term of this patent is extended or adjusted under 35 U.S.C. 154(b) by 0 days.

(21) Appl. No.: 14/432,972

(22) PCT Filed: Nov. 17, 2014

(86) PCT No.: PCT/KR2014/011032
§ 371 (c)(1),
(2) Date: Apr. 1, 2015

(87) PCT Pub. No.: WO2015/072801
PCT Pub. Date: May 21, 2015

(65) Prior Publication Data
US 2016/0244575 A1    Aug. 25, 2016

(30) Foreign Application Priority Data

Nov. 18, 2013  (KR) .................. 10-2013-0139968
Nov. 12, 2014  (KR) .................. 10-2014-0157390
Nov. 12, 2014  (KR) .................. 10-2014-0157391

(51) Int. Cl.
C08F 2/24       (2006.01)
A41D 19/00      (2006.01)
C08F 236/12     (2006.01)
C08L 47/00      (2006.01)

(52) U.S. Cl.
CPC ............ *A41D 19/0082* (2013.01); *C08F 2/24* (2013.01); *C08F 236/12* (2013.01); *C08L 47/00* (2013.01); *C08L 2201/52* (2013.01)

(58) Field of Classification Search
CPC ......... C08F 2/24; C08L 2201/52; C08L 47/00
See application file for complete search history.

(56) References Cited

U.S. PATENT DOCUMENTS

| | | | | |
|---|---|---|---|---|
| 3,904,558 A * | 9/1975 | Graham | .................... | C08J 9/30 428/319.9 |
| 4,102,844 A | 7/1978 | Schwinum et al. | | |
| 4,331,738 A * | 5/1982 | Kuan | .................. | B29C 37/0075 156/289 |
| 5,516,865 A * | 5/1996 | Urquiola | ............... | C08F 220/18 524/458 |
| 5,783,625 A * | 7/1998 | Mori | ...................... | C09J 109/04 524/430 |
| 6,376,600 B1 * | 4/2002 | Solomon | ............... | C08F 220/04 524/401 |
| 8,975,351 B2 * | 3/2015 | Kim | ...................... | C08F 236/12 526/297 |
| 9,353,298 B2 * | 5/2016 | Ha | ......................... | C09J 133/08 |
| 9,413,011 B2 * | 8/2016 | Kang | .................... | H01M 4/622 |
| 2002/0111431 A1 | 8/2002 | Kajiwara et al. | | |
| 2003/0114580 A1 * | 6/2003 | Kim | ...................... | C08F 279/02 524/534 |
| 2004/0010067 A1 * | 1/2004 | Ota | ........................ | B29C 41/14 524/432 |
| 2004/0057408 A1 * | 3/2004 | Gray | .................... | H04W 28/20 370/338 |
| 2012/0189911 A1 * | 7/2012 | Kang | .................. | H01M 10/052 429/211 |
| 2013/0017402 A1 * | 1/2013 | Kobayashi | ............... | C08F 2/26 428/514 |

(Continued)

FOREIGN PATENT DOCUMENTS

CN    1215136 C    8/2005
JP    S55-38821 A    3/1980

(Continued)

OTHER PUBLICATIONS

Zhu, et al., "Reactive emulsifiers for emulsion polymerization," Chemical Industry and Engineering Progress, vol. 25, No. 5, pp. 490-501 (2006).

*Primary Examiner* — Michael A Salvitti
(74) *Attorney, Agent, or Firm* — Dentons US LLP

(57) ABSTRACT

Disclosed is a carboxylic acid-modified nitrile-based copolymer latex composition, including 0.1-10 parts by weight of a reactive emulsifier based on 100 parts by weight of a monomer mixture, wherein the monomer mixture includes 40-88 wt % of a conjugated diene-based monomer, 10-50 wt % of an ethylenically unsaturated nitrile monomer and 0.1-10 wt % of an ethylenically unsaturated acid monomer. Also disclosed are a method of preparing the carboxylic acid-modified nitrile-based copolymer latex composition and a latex composition for dip molding including the same. The carboxylic acid-modified nitrile-based copolymer latex composition reduces generation of foam through the use of a reactive emulsifier different from the conventional adsorption/desorption type emulsifier, thereby preventing degradation of the quality of latex caused by foam. In addition, the carboxylic acid-modified nitrile-based copolymer latex composition avoids a need for introducing a defoaming agent for removing foam or maturation process.

16 Claims, No Drawings

(56) References Cited

U.S. PATENT DOCUMENTS

2015/0344746 A1* 12/2015 Ha .................. C09J 133/08
                                                 524/747
2016/0156038 A1*  6/2016 Park ................. H01M 4/622
                                                 429/217
2016/0244575 A1*  8/2016 Kim .................... C08J 5/02

FOREIGN PATENT DOCUMENTS

| JP | H11-152439 A |   | 6/1999 |
| JP | 2000319478 A | * | 11/2000 |
| JP | 2008120943 A |   | 5/2008 |
| JP | 2012201856 A |   | 10/2012 |
| KR | 20020036556 A |  | 5/2002 |
| KR | 2003-0076475 A | | 9/2003 |
| KR | 20040057070 A |  | 7/2004 |
| KR | 20040057408 A |  | 7/2004 |
| KR | 10-2013-0078767 A | | 7/2013 |
| KR | 10-2015-0058001 A | | 5/2015 |
| KR | 2015-0058000 A | | 5/2015 |
| WO | 2013-051205 A1 | | 4/2013 |

* cited by examiner

CARBOXYLIC ACID-MODIFIED NITRILE-BASED COPOLYMER LATEX COMPOSITION, PREPARATION METHOD THEREOF, AND LATEX COMPOSITION FOR DIP MOLDING INCLUDING THE SAME

This application is a National Stage Application of International Application No. PCT/KR2014/011032, filed Nov. 17, 2014, and claims the benefit of Korean Patent Application No. 10-2013-0139968, filed on Nov. 18, 2013, Korean Patent Application No. 10-2014-0157390, filed on Nov. 12, 2014, and Korean Patent Application No. 10-2014-0157391, filed on Nov. 12, 2014, all of which are hereby incorporated by reference in their entirety for all purposes as if fully set forth herein.

TECHNICAL FIELD

The present invention relates to a stabilized carboxylic acid-modified nitrile-based copolymer latex composition including a reactive emulsifier, a method of preparing thereof, and a latex composition for dip molding including the same.

BACKGROUND ART

A disposable rubber glove used widely in daily life, including housework, food industry, electronic industry and medical field, is made by dip molding of natural rubber or carboxylic acid-modified nitrile-based copolymer latex. Recently, carboxylic acid-modified nitrile-based gloves have been spotlighted in the market of disposable gloves due to the problems of allergy caused by natural protein of natural rubber and unstable supply and demand.

Such carboxylic acid-modified nitrile-based gloves are made by dipping a mold coated with a solidifier into latex formed by emulsion latex. A large amount of emulsifier is used for emulsion polymerization, and such emulsifier becomes a cause substance for foaming and pinhole formation during the production of gloves.

During the production of gloves, pinholes may form a puncture in gloves, leading to production of defected gloves. Thus, for the purpose of defoaming, a defoaming agent is introduced or a maturation process is required. Introducing a defoaming agent may cause defects in gloves since the defoaming agent itself may function as a foreign material. In addition, maturation undesirably increases the processing time.

Further, when an emulsifier is not removed sufficiently during leaching of the manufacturing process, it may remain in gloves and cause foaming or slipping upon the contact with water after the users put on the gloves. Such emulsifier remaining in gloves is one of the chemicals remaining in gloves like calcium and a releasing agent, and is known to adversely affect the quality of gloves.

Therefore, it is required to develop stable latex including an emulsifier that does not cause defects in dip molding products resulting from generation of a large amount of foam during polymerization or degradation of a feel of use resulting from outflow on the surface of dip molding products. To solve such problems, many studies have been conducted.

Hence, the present inventors have conducted researches about stable latex that does not generate a large amount of foam during polymerization or does not degrade a feel of use resulting from outflow on the surface of dip molding products. As a result, the inventors have found that when preparing latex by adding a reactive emulsifier different from the conventional adsorption/desorption type emulsifier, it is possible to obtain stable latex by using a small amount of reactive emulsifier while not generating a large amount of foam. The present invention is based on this finding.

DISCLOSURE

Technical Problem

An object of the present invention is to provide a carboxylic acid-modified nitrile-based copolymer latex composition including a reactive emulsifier, by which generation of foam during the latex polymerization is reduced, and thus high-quality stable latex is obtained without introduction of a defoaming agent for removing foam or maturation process.

Other object of the present invention is to provide a method of preparing the latex composition.

Another object of the present invention is to provide a latex composition for dip molding including the latex composition.

Technical Solution

To achieve these objects of the present invention, there is provided a carboxylic acid-modified nitrile-based copolymer latex composition, including 0.1-10 parts by weight of a reactive emulsifier based on 100 parts by weight of a monomer mixture, wherein the monomer mixture includes: 40-88 wt % of a conjugated diene-based monomer; 10-50 wt % of an ethylenically unsaturated nitrile monomer; and 0.1-10 wt % of an ethylenically unsaturated acid monomer.

There is also provided in the present invention, a method of preparing the carboxylic acid-modified nitrile-based copolymer latex composition including a conjugated diene-based monomer, ethylenically unsaturated nitrile monomer and ethylenically unsaturated acid monomer, wherein the reactive emulsifier is added simultaneously with the monomers before the polymerization begins and allowed to react, or the reactive emulsifier is added when the conversion of polymerization reaches 5-80% after the polymerization and allowed to react.

In addition, there is provided in the present invention a latex composition for dip molding including the carboxylic acid-modified nitrile-based copolymer latex composition.

Advantageous Effects

The carboxylic acid-modified nitrile-based copolymer latex composition according to the embodiments of the present invention reduces generation of foam during the polymerization through the use of a reactive emulsifier different from the conventional adsorption/desorption type emulsifier, thereby improving the quality of latex. In addition, the carboxylic acid-modified nitrile-based copolymer latex composition avoids a need for introducing a defoaming agent for removing foam or maturation process. Thus, it is possible to prevent defect generation caused by the use of such a defoaming agent and to simplify the manufacturing process.

In addition, since the latex composition for dip molding according to the embodiments of the present invention includes the carboxylic acid-modified nitrile-based copolymer latex composition, it causes no problem of outflow of emulsifier on surface during the production of dip molding products, and thus provides dip molding products with a good feel of use.

BEST MODE

Hereinafter the present invention will be explained in more detail to assist the understanding thereof.

In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In one aspect, there is provided in the present invention a carboxylic acid-modified nitrile-based copolymer latex composition including an ethylenically unsaturated nitrile monomer, ethylenically unsaturated acid monomer and a reactive monomer.

According to an embodiment, the latex composition includes 0.1-10 parts by weight of a reactive emulsifier based on 100 parts by weight of a monomer mixture, wherein the monomer mixture includes: 40-88 wt % of a conjugated diene-based monomer; 10-50 wt % of an ethylenically unsaturated nitrile monomer; and 0.1-10 wt % of an ethylenically unsaturated acid monomer.

According to another embodiment, the monomer mixture may include the conjugated diene-based monomer in an amount of 40-88 wt %, preferably 45-80 wt %. When the conjugated diene-based monomer is used in an amount less than 40 wt %, the resultant dip molding product may become rigid and have a degraded feel of use. When the conjugated diene-based monomer is used in an amount greater than 88 wt %, the resultant dip molding product may have reduced oil resistance and low tensile strength.

Particularly, the conjugated diene-based monomer may be 1,3-butadiene, 2,3-dimethyl-1,3-butadiene, 2-ethyl-1,3-butadiene, 1,3-pentadiene, isoprene or a combination thereof, preferably 1,3-butadiene or isoprene, and more preferably 1,3-butadiene.

According to still another embodiment, the monomer mixture may include the ethylenically unsaturated nitrile monomer in an amount of 10-50 wt %, preferably 15-45 wt %. When the ethylenically unsaturated nitrile monomer is used in an amount less than 10 wt %, the resultant dip molding product may have reduced oil resistance and low tensile strength. When the ethylenically unsaturated nitrile monomer is used in an amount greater than 50 wt %, the resultant dip molding product may become rigid and have a degraded feel of use.

Particularly, the ethylenically unsaturated nitrile monomer may be acrylonitrile, methacrylonitrile, fumaronitrile, α-chloronitrile, α-cyanoethyl acrylonitrile or a combination thereof, preferably acrylonitrile or methacrylonitrile, and more preferably acrylonitrile.

According to still another embodiment, the monomer mixture may include the ethylenically unsaturated acid monomer in an amount of 0.1-10 wt %, preferably 0.5-9 wt %, and more preferably 1-8 wt %. When the ethylenically unsaturated acid monomer is used in an amount less than 0.1 wt %, the resultant dip molding product may have low tensile strength. When the ethylenically unsaturated nitrile monomer is used in an amount greater than 10 wt %, the resultant dip molding product may become rigid and have a degraded feel of use.

Particularly, the ethylenically unsaturated acid monomer may be one having a carboxyl group, sulfonate group or an acid anhydride group. More particularly, the ethylenically unsaturated acid monomer may be acrylic acid, methacrylic acid, itaconic acid, maleic acid, fumaric acid, maleic anhydride, citraconic anhydride, styrene sulfonate, monobutyl fumarate, monobutyl maleate, mono-2-hydroxypropyl maleate or a combination thereof, preferably acrylic acid, methacrylic acid, itaconic acid, maleic acid or fumaric acid, and more preferably methacrylic acid.

According to still another embodiment, the carboxylic acid-modified nitrile-based copolymer latex composition may include the reactive emulsifier in an amount of 0.1-10 parts by weight, preferably 0.1-5 parts by weight, based on 100 parts by weight of the monomer mixture.

In general, an emulsifier has an important effect on the polymerization rate, particle size and distribution, molecular weight and particle shape in emulsion polymerization. A currently used ionic low-molecular weight adsorption/desorption type emulsifier does not form a chemical bonding with the copolymer latex to be formed. Thus, when producing dip molding products using the copolymer latex, such an emulsifier may agglomerate and undergo phase separation from the copolymer latex. Further, the phase-separated emulsifier may be desorbed when it is wetted with water, and thus causes generation of surface defects at the portion where the emulsifier originally exists. Therefore, such an emulsifier may adversely affect the physical properties of dip molding products.

However, the reactive emulsifier according to an embodiment of the present invention forms a chemical bonding with the resultant copolymer latex, and thus increases the polymerization rate during the polymerization of copolymer latex and reduces generation of foam. Therefore, when preparing dip molding products using the copolymer latex, it is possible to inhibit the phase separation of reactive emulsifier from the latex, thereby improving the thermal stability. It is also possible to prevent the reactive emulsifier from flowing out to the surface of a dip molding product. As a result, it is possible to prevent degradation of the quality of a finished dip molding product.

The reactive emulsifier may be at least one selected from the group consisting of polyoxyethylene-1-(aryloxymethyl)alkyl ether sulfonate, sodium 2-hydroxy-3-(methacryloyloxy)propane-1-sulfonate, sodium 11-methacryloylundecane-1-yl-sulfate, sodium 11-crotonoylundecane-1-yl-sulfate, sodium dodecyl aryl sulfosuccinate and sodium 3-sulfopropyltetradecyl maleate. Preferably, the reactive emulsifier may be polyoxyethylene-1-(aryloxymethyl)alkyl ether sulfonate, sodium dodecyl aryl sulfosuccinate or a combination thereof. Herein, in the polyoxyethylene-1-(aryloxymethyl)alkyl ether sulfonate, the number of repeating units of oxyethylene group (EO) may be 5-10.

In addition, the carboxylic acid-modified nitrile-based copolymer latex composition may further include an anionic surfactant. Particular examples of the anionic surfactant may include sodium dodecylbenzene sulfonate, alkylbenzene sulfonate, aliphatic sulfonate, sulfate ester salt of higher alcohol, α-olefin sulfonate and alkyl ether sulfate. When the carboxylic acid-modified nitrile-based copolymer latex composition further includes an anionic surfactant, the anionic surfactant may be used in an amount of 0.1-10 parts by weight, preferably 0.1-3 parts by weight, based on 100 parts by weight of the total monomer mixture.

In addition, the monomer mixture according to an embodiment of the present invention may further include an ethylenically unsaturated monomer in an amount up to 20 parts by weight based on 100 parts by weight of the monomer mixture. Preferably, the ethylenically unsaturated monomer may be used in an amount of less than 20 parts by weight. When the ethylenically unsaturated monomer is used in an amount larger than 20 parts by weight, a good balance between a feel of use and tensile strength cannot be accomplished, resulting in degradation of the quality of a dip molding product.

The ethylenically unsaturated monomer may be styrene, alkyl styrene, vinyl naphthalene, fluoroethyl vinyl ether, (meth)acrylamide, N-methylol (meth)acrylamide, N,N-dimethylol (meth)acrylamide, N-methoxymethyl (meth)acrylamide, N-propoxymethyl (meth)acrylamide, vinylpyridine, vinylnorbornene, dicyclopentadiene, 1,4-hexadiene, methyl (meth)acrylate, ethyl (meth)acrylate, butyl (meth)acrylate, 2-ethylhexyl (meth)acrylate, trifluroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth) acrylate, cyanomethyl (meth)acrylate, 2-cyanoethyl (meth) acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxyethyl (meth)acrylate, hydroxypropyl (meth)acrylate, glycidyl (meth)acrylate, dimethylaminoethyl (meth)acrylate or a combination thereof, but is not limited thereto.

Further, the carboxylic acid-modified nitrile-based copolymer latex composition may further include 0.01-2 parts by weight of a polymerization initiator and 0.1-0.9 parts by weight of a molecular weight modifier, preferably 0.02-1.5 parts by weight of a polymerization initiator and 0.2-0.7 parts by weight of a molecular weight modifier, based on 100 parts by weight of the monomer mixture.

The polymerization initiator is not particularly limited. For example, the polymerization initiator may include: inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butylperoxy isobutyrate; nitrogen compounds such as azobisisobutyronitrile, azobis-2,4-dimethylvaleronitrile, azobiscyclohexanecarbonitrile and methyl azobisisobutyrate.

The molecular weight modifier is not particularly limited. For example, the molecular weight modifier may include: mercaptanes such as α-methylstyrene dimer, t-dodecyl mercaptane, n-dodecyl mercaptane and octyl mercaptane; halogenated hydrocarbons such as tetrachlorocarbon, methylene chloride and methylene bromide; and sulfur-containing compounds such as tetraethyl diuram disulfide, dipentamethylene diuram disulfide and diisopropylxanthogen disulfide.

In another aspect, there is provided a method of preparing the carboxylic acid-modified nitrile-based copolymer latex composition including a conjugated diene-based monomer, ethylenically unsaturated nitrile monomer, ethylenically unsaturated acid monomer and a reactive monomer.

Each of the monomers, reactive emulsifier and optionally added additives such as a polymerization initiator and molecular weight modifier are the same as described above.

The method of preparing the carboxylic acid-modified nitrile-based copolymer latex composition includes adding the reactive emulsifier simultaneously with the monomers contained in the carboxylic acid-modified nitrile-based copolymer latex composition before the polymerization begins and initiating the polymerization, or adding the reactive emulsifier separately from the monomers when the conversion of polymerization reaches 5-80% after the polymerization of monomers and carrying out the polymerization.

Preferably, the reactive emulsifier may be added when the conversion of polymerization reaches 40-70% after the polymerization begins. In this case, there is provided an advantage in that the reactive emulsifier may be distributed on the exterior of monomer mixture particles so that the stability of latex composition may be further improved.

Herein, the conversion may be determined by the method generally known to those skilled in the art.

Particularly, a predetermined amount of sample is taken from the reaction composition, such as the reaction mixture for preparing the carboxylic acid-modified nitrile-based copolymer latex composition including the monomer mixture and reactive emulsifier at a predetermined interval, the solid content of each sample is measured, and the polymerization conversion is calculated by using the following formula.

$$\text{Conversion}(X) = \frac{(M_s - M_o)}{(M_p - M'_o)}$$

wherein $M_s$ means the weight of dried copolymer latex, $M_o$ means the weight of reactive emulsifier and initiator, and $M_p$ means the weight of 100% polymerized polymer.

Hereinafter, the method of preparing the carboxylic acid-modified nitrile-based copolymer latex composition will be explained in detail.

The carboxylic acid-modified nitrile-based copolymer latex composition according to an embodiment of the present invention may be obtained through emulsion polymerization generally used in the art. Mixing the ingredients of latex composition is not particularly limited. Particularly, the ingredients, such as the conjugated diene-based monomer, ethylenically unsaturated nitrile monomer, ethylenically unsaturated acid monomer and reactive emulsifier may be introduced to a polymerization reactor at the same time, the ingredients may be added to a polymerization reactor continuously, or the monomers forming the latex composition may be added preliminarily to a polymerization reactor to initiate the polymerization and then the reactive emulsifier may be added thereto.

Further, in order to facilitate the polymerization, additives may be used optionally and particular examples thereof include a chelating agent, dispersant, pH modifier, deoxidizing agent, particle diameter modifier, antiaging agent, and oxygen scavenger. The polymerization may be carried out generally at a temperature ranging from 10° C. to 90° C., preferably from 25° C. to 75° C.

In still another aspect, there is provided a latex composition for dip molding including the carboxylic acid-modified nitrile-based copolymer latex composition according to an embodiment of the present invention.

The latex composition for dip molding may include 80-99 wt %, preferably 85-98 wt %, and more preferably 88-97 wt % of the carboxylic acid-modified nitrile-based copolymer latex composition obtained by using a reactive emulsifier.

The latex composition for dip molding may have a solid content of 10-40 wt %, preferably 15-35 wt %, and more preferably 18-33 wt %.

The latex composition for dip molding may have a pH of 8.0-12, preferably 9-11, and more preferably 9.3-10.5.

In addition, the latex composition for dip molding including the carboxylic acid-modified nitrile-based copolymer latex composition according to an embodiment of the present invention may be used advantageously for producing dip molding products. The dip molding products are not particularly limited and non-limiting examples thereof may include gloves for family use, gloves for industrial use, condoms, or catheters.

Exemplary embodiments now will be described more fully hereinafter. The following examples are for illustrative purposes only and not intended to limit the scope of the present invention.

EXAMPLE 1

1) Preparation of Carboxylic Acid-Modified Nitrile-Based Copolymer Latex

To a polymerization reactor, added are a monomer mixture including 29 wt % of acrylonitrile, 65 wt % of 1,4-butadiene and 6 wt % of methacrylic acid, and 0.5 parts by weight of t-dodecyl mercaptan, 2 parts by weight of polyoxyethylene-1-(aryloxymethyl)alkyl ether sulfonate (Aquaron KH-10), 1 part by weight of sodium dodecylbenzene sulfonate, 0.6 parts by weight of potassium persulfate and 140 parts by weight of water, each based on 100 parts by weight of the monomer mixture. Then, the reaction mixture is subjected to polymerization at a temperature of 40° C. When the polymerization conversion reaches 65%, polymerization is allowed to proceed at a temperature increased to 55° C. Then, when the conversion reaches 94%, 0.3 parts by weight of ammonium hydroxide is added to quench the polymerization. Then, the unreacted materials are removed from the reaction mixture, and aqueous ammonia, an antioxidant and a defoaming agent are added to obtain carboxylic acid-modified nitrile-based copolymer latex having a solid content of 45% and pH of 8.5.

EXAMPLE 2

Carboxylic acid-modified nitrile-based copolymer latex having a solid content of 45% and pH of 8.5 is obtained in the same manner as Example 1, except that polyoxyethylene-1-(aryloxymethyl)alkyl ether sulfonate (Aquaron KH-10) is used in an amount of 3 parts by weight and sodium dodecylbenzene sulfonate is not used.

EXAMPLE 3

Carboxylic acid-modified nitrile-based copolymer latex having a solid content of 45% and pH of 8.5 is obtained in the same manner as Example 1, except that 1.5 parts by weight of sodium dodecylbenzene sulfonate is introduced before the polymerization, and polyoxyethylene-1-(aryloxymethyl)alkyl ether sulfonate (Aquaron KH-10) is introduced in an amount of 0.5 parts by weight when the polymerization conversion reaches 60%.

EXAMPLE 4

Carboxylic acid-modified nitrile-based copolymer latex having a solid content of 45% and pH of 8.5 is obtained in the same manner as Example 1, except that 2 parts by weight of sodium dodecyl aryl sulfosuccinate is used instead of polyoxyethylene-1-(aryloxymethyl)alkyl ether sulfonate.

EXAMPLE 5

Carboxylic acid-modified nitrile-based copolymer latex having a solid content of 45% and pH of 8.5 is obtained in the same manner as Example 4, except that sodium dodecyl aryl sulfosuccinate is used in an amount of 3 parts by weight and sodium dodecylbenzene sulfonate is not used.

EXAMPLE 6

Carboxylic acid-modified nitrile-based copolymer latex having a solid content of 45% and pH of 8.5 is obtained in the same manner as Example 4, except that 1.5 parts by weight of sodium dodecylbenzene sulfonate is introduced before the polymerization, and 0.5 parts by weight of sodium dodecyl aryl sulfosuccinate is introduced in an amount of 0.5 parts by weight when the polymerization conversion reaches 60%.

COMPARATIVE EXAMPLE 1

Carboxylic acid-modified nitrile-based copolymer latex is obtained in the same manner as Example 1, except that polyoxyethylene-1-(aryloxymethyl)alkyl ether sulfonate (Aquaron KH-10) is not used and sodium dodecylbenzene sulfonate is used in an amount of 3 parts by weight.

COMPARATIVE EXAMPLE 2

Carboxylic acid-modified nitrile-based copolymer latex is obtained in the same manner as Example 1, except that UM-9010 (acrylate-acrylic acid copolymer, Mw=4500), a polymeric reactive emulsifier, is used in an amount of 2 parts by weight instead of sodium aryloxy hydroxypropyl sulfonate.

TEST EXAMPLE 1

Analysis of Degree of Foam Generation

To carry out the comparative analysis between the carboxylic acid-modified nitrile-based copolymer latex of each of Examples 1 to 6 including a reactive emulsifier according to the present invention and the carboxylic acid-modified nitrile-based copolymer latex of each of Comparative Examples 1 and 2 in terms of a degree of foam generation, each latex is determined for a degree of foam generation.

The degree of foam generation is determined by introducing 20 g of each latex to a mess cylinder, sealing the inlet, shaking the cylinder 20 times above and below, and measuring the height.

The test results are shown in the following Table 1. It should be noted that, a larger amount of foam is generated, as the foam generation height increases.

TABLE 1

| | Foam generation height (mm) |
|---|---|
| Ex. 1 | 10 |
| Ex. 2 | 2 |
| Ex. 3 | 12 |
| Ex. 4 | 20 |
| Ex. 5 | 5 |
| Ex. 6 | 12 |
| Comp. Ex. 1 | 36 |
| Comp. Ex. 2 | 21 |

As shown in Table 1, the carboxylic acid-modified nitrile-based copolymer latex of each of Examples 1 to 6 including a reactive emulsifier, such as polyoxyethylene-1-(aryloxymethyl)alkyl ether sulfonate or sodium dodecyl aryl sulfosuccinate, according to the present invention shows a significantly lower degree of foam generation as compared to the carboxylic acid-modified nitrile-based copolymer latex of Comparative Example 1 using no reactive emulsifier. Particularly, the carboxylic acid-modified nitrile-based copolymer latex of Comparative Example 1 provides a degree of foam generation increased by at least 1.8 times and at most 18 times as compared to the carboxylic acid-modified nitrile-based copolymer latex of each of Examples 1 to 6.

This means that the reactive emulsifier according to the present invention effectively inhibits foam generated during the latex polymerization.

TEST EXAMPLE 2

Analysis of Syneresis Characteristics

The carboxylic acid-modified nitrile-based copolymer latex of each of Examples 1 to 6 including a reactive emulsifier according to the present invention and the carboxylic acid-modified nitrile-based copolymer latex of each of Comparative Examples 1 and 2 are compared with each other in terms of syneresis characteristics. The results are shown in Table 2.

The syneresis of each latex is determined as follows.

First, potassium hydroxide solution, 1 wt % of sulfur, 0.5 wt % of ZDBC (zinc dibuthyldithiocarbamate), 1.5 wt % of zinc oxide, 0.5 wt % of titanium oxide and an adequate amount of dispersant and secondary distilled water are added to each latex to obtain a latex composition for dip molding having a solid content of 20% and pH of 10.0.

Separately from the latex composition for dip molding, 22 wt % of calcium nitrate, 69.5 wt % of water, 8 wt % of calcium carbonate and 0.5 wt % of a wetting agent (Teric 320, Huntsman Corporation, Australia) are mixed together to obtain a solidifier solution. A hand-shaped ceramic mold is dipped into the solidifier solution for 1 minute and removed therefrom. Then, the mold is dried at 70° C. for 3 minutes so that the hand-shaped mold is coated with the solidifier. Then, the hand-shaped mold coated with the solidifier is dipped into the latex composition for dip molding for 1 minute, removed therefrom, and the time required for liquid dropping from the hand-shaped mold is measured.

TABLE 2

| | Syneresis (min) |
|---|---|
| Ex. 1 | 2.5 |
| Ex. 2 | 2.6 |
| Ex. 3 | 2 |
| Ex. 4 | 2.5 |
| Ex. 5 | 2.6 |
| Ex. 6 | 2 |
| Comp. Ex. 1 | 2.1 |
| Comp. Ex. 2 | 1 |

As shown in Table 2, the carboxylic acid-modified nitrile-based copolymer latex of each of Examples 1 to 6 including a reactive emulsifier, such as polyoxyethylene-1-(aryloxymethyl)alkyl ether sulfonate or sodium dodecyl aryl sulfosuccinate, according to the present invention shows significantly improved syneresis characteristics as compared to the carboxylic acid-modified nitrile-based copolymer latex of Comparative Example 2 using a polymeric reactive emulsifier not the reactive emulsifier according to the present invention. This suggests that the polymeric reactive emulsifier used in Comparative Example 2 has low reactivity to the monomers forming the carboxylic acid-modified nitrile-based copolymer latex so that the monomers may not form a bonding with the polymer chain of the polymeric reactive emulsifier, and thus it functions like a non-ionic emulsifier.

In general, carboxylic acid-modified nitrile-based copolymer latex shows a foam generation phenomenon and syneresis characteristics affected by the emulsifier added thereto during the preparation. Particularly, according to the particular type of emulsifier, such as an ionic emulsifier, non-ionic emulsifier or a reactive emulsifier, a large amount of foam may be generated or syneresis characteristics may be degraded significantly. This can be demonstrated by the results of Test Examples 1 and 2, which show that the reactive emulsifier according to the present invention inhibits foam generation and imparts excellent syneresis characteristics.

Production of Dip Molding Products Using Carboxylic Acid-Modified Nitrile-Based Copolymer Latex Composition

EXAMPLE 7

A dip molding product is obtained by using the carboxylic acid-modified nitrile-based copolymer latex obtained from Example 1.

First, potassium hydroxide solution, 1 wt % of sulfur, 0.5 wt % of ZDBC, 1.5 wt % of zinc oxide, 0.5 wt % of titanium oxide and an adequate amount of dispersant and secondary distilled water are added to the carboxylic acid-modified nitrile-based copolymer latex obtained from Example 1 to obtain a latex composition for dip molding having a solid content of 20% and pH of 10.0.

Separately from the latex composition for dip molding, 22 wt % of calcium nitrate, 69.5 wt % of water, 8 wt % of calcium carbonate and 0.5 wt % of a wetting agent (Teric 320, Huntsman Corporation, Australia) are mixed together to obtain a solidifier solution. A hand-shaped ceramic mold is dipped into the solidifier solution for 1 minute and removed therefrom. Then, the mold is dried at 70° C. for 3 minutes so that the hand-shaped mold is coated with the solidifier. Then, the hand-shaped mold coated with the solidifier is dipped into the latex composition for dip molding for 1 minute, removed therefrom, dried at 70° C. for 2 minutes, and dipped into water for 3 minutes to carry out leaching. The mold is further dried at 70° C. for 3 minutes and subjected to crosslinking at 130° C. for 20 minutes. Then, the crosslinked dip molding layer is removed from the hand-shaped mold to obtain a glove-shaped dip molding product.

EXAMPLE 8

A dip molding product is obtained in the same manner as Example 7, except that the carboxylic acid-modified nitrile-based copolymer latex obtained from Example 2 is used.

EXAMPLE 9

A dip molding product is obtained in the same manner as Example 7, except that the carboxylic acid-modified nitrile-based copolymer latex obtained from Example 3 is used.

EXAMPLE 10

A dip molding product is obtained in the same manner as Example 7, except that the carboxylic acid-modified nitrile-based copolymer latex obtained from Example 4 is used.

EXAMPLE 11

A dip molding product is obtained in the same manner as Example 7, except that the carboxylic acid-modified nitrile-based copolymer latex obtained from Example 5 is used.

EXAMPLE 12

A dip molding product is obtained in the same manner as Example 7, except that the carboxylic acid-modified nitrile-based copolymer latex obtained from Example 6 is used.

COMPARATIVE EXAMPLE 3

A dip molding product is obtained in the same manner as Example 7, except that the carboxylic acid-modified nitrile-based copolymer latex obtained from Comparative Example 1 is used.

COMPARATIVE EXAMPLE 4

A dip molding product is obtained in the same manner as Example 7, except that the carboxylic acid-modified nitrile-based copolymer latex obtained from Comparative Example 2 is used.

TEST EXAMPLE 3

Analysis of Mechanical Properties and Degree of Foam Generation of Dip Molding Products To carry out the comparison between the dip molding products of Examples 7-12 including the carboxylic acid-modified nitrile-based copolymer latex composition including a reactive emulsifier according to the present invention and those of Comparative Examples 3 and 4 in terms of mechanical properties and a degree of foam generation, each dip molding product is determined for the tensile strength, elongation, stress at 300% of elongation and degree of foam generation.

1) Mechanical Properties

To carry out the comparison between the dip molding products of Examples 7-12 including the carboxylic acid-modified nitrile-based copolymer latex composition including a reactive emulsifier according to the present invention and those of Comparative Examples 3 and 4 in terms of mechanical properties and a degree of foam generation, each dip molding product is determined for the tensile strength, elongation and stress at 300% elongation. The results are shown in Table 3.

The tensile strength, elongation and stress at 300% elongation are determined by using a dumbbell-like sample according to ASTM D-412. Each sample is drawn at an elongation rate of 500 mm/min, and the stress at 300% elongation, tensile strength at break and elongation at break are measured. The results are shown in Table 3.

TABLE 3

| | Tensile strength (MPa) | Elongation (%) | Stress (MPa, at 300%) |
|---|---|---|---|
| Ex. 7 | 29.96 | 518 | 3.2 |
| Ex. 8 | 28.5 | 547 | 3.0 |
| Ex. 9 | 32.0 | 525 | 3.3 |
| Ex. 10 | 29.9 | 518 | 3.2 |
| Ex. 11 | 28.5 | 547 | 3.0 |
| Ex. 12 | 32.0 | 525 | 3.3 |

TABLE 3-continued

| | Tensile strength (MPa) | Elongation (%) | Stress (MPa, at 300%) |
|---|---|---|---|
| Comp. Ex. 3 | 31.8 | 520 | 3.4 |
| Comp. Ex. 4 | 27 | 550 | 2.8 |

2) Degree of Foam Generation

The dip molding products using each of the carboxylic acid-modified nitrile-based copolymer latex compositions of Examples 7-12 and Comparative Examples 3 and 4 are compared with each other in terms of a degree of foam generation.

The degree of foam generation is determined while varying the leaching condition of each dip molding product. A dip molding product is obtained in the same manner as Example 7 by using each of the carboxylic acid-modified nitrile-based copolymer latex compositions, except that the leaching condition is varied to 50° C./1 minute, 30° C./1 minute, 50° C./30 seconds and 50° C./10 seconds. Then, 2 ml of distilled water is applied to each of the resultant dip molding products, followed by rubbing. The degree of foam generation is evaluated relatively based on 10-point rating. As the rate increases, the glove shows a lower degree of foam generation. The results are shown in Table 4.

TABLE 4

| | 50° C., 1 min | 30° C., 1 min | 50° C., 30 sec | 50° C., 10 sec |
|---|---|---|---|---|
| Ex. 7 | 9 | 7 | 8 | 8 |
| Ex. 8 | 9 | 8 | 9 | 8 |
| Ex. 9 | 7 | 7 | 6 | 6 |
| Ex. 10 | 9 | 7 | 8 | 8 |
| Ex. 11 | 9 | 8 | 9 | 8 |
| Ex. 12 | 7 | 7 | 6 | 6 |
| Comp. Ex. 3 | 3 | 1 | 1 | 1 |
| Comp. Ex. 4 | 6 | 5 | 5 | 5 |

As shown in Tables 3 and 4, the dip molding products of Examples 7-12 obtained by using the carboxylic acid-modified nitrile-based copolymer latex including a reactive emulsifier according to the present invention show a significantly reduced degree of foam generation, while maintaining similar mechanical properties, as compared to the dip molding product of Comparative Example 3 using the carboxylic acid-modified nitrile-based copolymer latex of Comparative Example 1 including a conventional emulsifier not the reactive emulsifier according to the present invention, and the dip molding product of Comparative Example 4 using the carboxylic acid-modified nitrile-based copolymer latex of Comparative Example 2 including a reactive emulsifier different from the reactive emulsifier according to the present invention. This suggests that the reactive emulsifier according to the present invention allows the latex to maintain its mechanical properties, and realizes improved stability so that it may not flow out to the surface even after dip molding.

The invention claimed is:

1. A composition for preparing a carboxylic acid-modified nitrile-based copolymer latex comprising 0.1-10 parts by weight of a reactive emulsifier based on 100 parts by weight of a monomer mixture, wherein the monomer mixture comprises:
   a) 40-88 wt % of a conjugated diene-based monomer;
   b) 10-50 wt % of an ethylenically unsaturated nitrile monomer; and c) 0.1-10 wt % of an ethylenically unsaturated acid monomer, and wherein the reactive emulsifier is at least one selected from the group consisting of polyoxyethylene-1-(aryloxymethyl)alkyl ether sulfonate, sodium 2-hydroxy-3-(methacryloyloxy)propane-1-sulfonate, sodium 11-methacryloylundecane-1-yl-sulfate, sodium 11-crotonoylundecane-1-yl-sulfate, sodium dodecyl aryl sulfosuccinate and sodium 3-sulfopropyltetradecyl maleate.

2. The composition according to claim 1, wherein the conjugated diene-based monomer is at least one selected from the group consisting of 1,3-butadiene, 2,3-dimethyl-1,3-butadiene, 2-ethyl-1,3-butadiene, 1,3-pentadiene and isoprene.

3. The composition according to claim 1, wherein the ethylenically unsaturated nitrile monomer is at least one selected from the group consisting of acrylonitrile, methacrylonitrile, fumaronitrile, α-chloronitrile and α-cyanoethyl acrylonitrile.

4. The composition according to claim 1, wherein the ethylenically unsaturated acid monomer is one having a carboxyl group, sulfonate group or an acid anhydride group.

5. The composition according to claim 4, wherein the ethylenically unsaturated acid monomer is at least one selected from the group consisting of acrylic acid, methacrylic acid, itaconic acid, maleic acid, fumaric acid, maleic anhydride, citraconic anhydride, styrene sulfonate, monobutyl fumarate, monobutyl maleate and mono-2-hydroxypropyl maleate.

6. The composition according to claim 1, wherein the reactive emulsifier is at least one selected from the group consisting of polyoxyethylene-1-(aryloxymethyl)alkyl ether sulfonate and sodium dodecyl aryl sulfosuccinate.

7. The composition according to claim 1, which further comprises an anionic surfactant in an amount of 0.1-10 parts by weight based on 100 parts by weight of the total monomer mixture.

8. The composition according to claim 7, wherein the anionic surfactant is at least one selected from the group consisting of sodium dodecylbenzene sulfonate, alkylbenzene sulfonate, aliphatic sulfonate, sulfate ester salt of higher alcohol, α-olefin sulfonate and alkyl ether sulfate.

9. The composition according to claim 1, wherein the monomer mixture further comprises an ethylenically unsaturated monomer in an amount of 1-20 parts by weight based on 100 parts by weight of the monomer mixture.

10. The composition according to claim 9, wherein the ethylenically unsaturated monomer is at least one selected from the group consisting of styrene, alkyl styrene, vinyl naphthalene, fluoroethyl vinyl ether, (meth)acrylamide, N-methylol (meth)acrylamide, N,N-dimethylol (meth)acrylamide, N-methoxymethyl (meth)acrylamide, N-propoxymethyl (meth)acrylamide, vinylpyridine, vinylnorbornen, dicyclopentadiene, 1,4-hexadiene, methyl (meth)acrylate, ethyl (meth)acrylate, butyl (meth)acrylate, 2-ethylhexyl (meth)acrylate, trifluroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxyethyl (meth)acrylate, hydroxypropyl (meth)acrylate, glycidyl (meth)acrylate, and dimethylaminoethyl (meth)acrylate.

11. The composition according to claim 1, which comprises 0.01-2 parts by weight of a polymerization initiator and 0.1-0.9 parts by weight of a molecular weight modifier, based on 100 parts by weight of the monomer mixture.

12. A method of preparing a carboxylic acid-modified nitrile-based copolymer latex composition from the composition according to claim 1, the method comprising: adding the reactive emulsifier simultaneously to the monomer mixture before the initiation of a polymerization reaction and carrying out the polymerization reaction; or adding the reactive emulsifier to the monomer mixture after 5-80% polymerization of the monomer mixture and carrying out the polymerization reaction.

13. The method of preparing a carboxylic acid-modified nitrile-based copolymer latex composition according to claim 12, wherein the monomer mixture further comprises an ethylenically unsaturated monomer in an amount of 1-20 parts by weight based on 100 parts by weight of the monomer mixture.

14. A latex composition for dip molding, comprising 80-99 wt % of the carboxylic acid-modified nitrile-based copolymer latex composition prepared from the composition according to claim 1.

15. A dip molding product obtained from the latex composition for dip molding as defined in claim 14.

16. The dip molding product according to claim 15, which is at least one selected from the group consisting of gloves for family use, gloves for industrial use, gloves for medical use, condoms, and catheters.

* * * * *